United States Patent
Edwards et al.

(10) Patent No.: US 7,606,642 B2
(45) Date of Patent: Oct. 20, 2009

(54) JUST IN TIME WIRING INFORMATION SYSTEM

(75) Inventors: Gail E. Edwards, Toms River, NJ (US); Thomas P. Kowalski, Little Egg Harbor, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/437,587

(22) Filed: May 8, 2009

(65) Prior Publication Data

US 2009/0216762 A1 Aug. 27, 2009

Related U.S. Application Data

(62) Division of application No. 11/251,535, filed on Sep. 29, 2005, now Pat. No. 7,548,801.

(51) Int. Cl.
*B64F 5/00* (2006.01)
*H02G 3/00* (2006.01)
(52) U.S. Cl. .................................... 701/29; 324/503
(58) Field of Classification Search ............... 701/29; 324/503
See application file for complete search history.

(56) References Cited

U.S. PATENT DOCUMENTS

| | | | | |
|---|---|---|---|---|
| 5,704,189 | A * | 1/1998 | Collier | 52/741.1 |
| 5,903,156 | A * | 5/1999 | Matsumaru et al. | 324/533 |
| 6,272,387 | B1 * | 8/2001 | Yoon | 700/83 |
| 6,438,535 | B1 * | 8/2002 | Benjamin et al. | 707/2 |
| 6,650,956 | B2 * | 11/2003 | Takada et al. | 700/110 |
| 7,368,919 | B2 * | 5/2008 | Gervais | 324/539 |
| 2003/0023611 | A1 * | 1/2003 | Benjamin et al. | 707/101 |
| 2004/0078387 | A1 * | 4/2004 | Benjamin et al. | 707/102 |
| 2004/0103116 | A1 * | 5/2004 | Palanisamy et al. | 707/104.1 |
| 2005/0114096 | A1 * | 5/2005 | Baum et al. | 703/1 |
| 2005/0187721 | A1 * | 8/2005 | Baust et al. | 702/34 |
| 2005/0187739 | A1 * | 8/2005 | Baust et al. | 702/184 |
| 2007/0032207 | A1 * | 2/2007 | Shah | 455/111 |

\* cited by examiner

*Primary Examiner*—Thomas G Black
*Assistant Examiner*—Shelley Chen
(74) *Attorney, Agent, or Firm*—Mark O. Glut

(57) ABSTRACT

A just in time wiring information system, which includes an aircraft wiring information system module, a technical reference module, an interactive computer aided cable repair system module, and an e-suite. The e-suite communicates with the aircraft wiring information system module, the technical reference module, and the interactive computer aided cable repair system module such that via the e-suite a user may obtain information from each of the modules.

5 Claims, 7 Drawing Sheets

JUST IN TIME WIRING INFORMATION SYSTEM

CROSS REFERENCES

This application is a division of co-pending application Ser. No. 11/251,535, filed Sep. 29, 2005, now U.S. Pat. No. 7,548,801 entitled Just In Time Wiring Information System.

STATEMENT OF GOVERNMENT INTEREST

The invention described herein may be manufactured and used by or for the Government of the United States of America for governmental purposes without payment of any royalties thereon or therefor.

COMPUTER PROGRAM LISTING APPENDIX

This application contains an appendix consisting of a computer program listing over 300 lines. In accordance with 37 CFR 1.96(c), a computer program listing having over 300 lines must be submitted on a compact disc conforming to the standards set forth in 37 CFR 1.52(e). Two identical compact discs have been filed with the Patent & Trademark Office in accordance with Title 37 of the Code of Federal Regulations and each compact disc contains the following files:

| Filename | Size | Date Created |
| --- | --- | --- |
| Build.jsp | 6.6 KB | Apr. 12, 2005 |
| Build-prod.jsp | 6.66 KB | Apr. 12, 2005 |
| fw_menu.js | 22.3 KB | Apr. 12, 2005 |
| icars.css | 2.32 KB | Apr. 12, 2005 |
| ICACRS.ZIP | 135 KB | Apr. 12, 2005 |
| ICACRSUser.zip | 57.7 KB | Apr. 12, 2005 |
| ItemMSPEC.class | 10.1 KB | Apr. 12, 2005 |
| JTWISMain.htm | 1.02 KB | Apr. 12, 2005 |
| JTWISMain.jpg | 58.2 KB | Apr. 12, 2005 |
| Techdata.jsp | 1.06 KB | Apr. 12, 2005 |
| Titlebar.jpg | 17.1 KB | Apr. 12, 2005 |
| tooling.jsp | 1.91 KB | Apr. 12, 2005 |

The material on the compact discs and the computer program listing appendix is hereby incorporated-by-reference.

BACKGROUND

The present invention relates to an information system. More specifically, but without limitation, the present invention relates to a just in time wiring information system.

A United States Government study identified wiring maintenance actions as the leading cause of unscheduled maintenance man-hours. Further evaluation of these maintenance actions has proven that unscheduled wiring system maintenance actions on aircraft wiring systems account for almost 1.5 million maintenance man-hours within Naval Aviation alone. Much of the maintenance time is spent researching required technical information relevant to the components and tooling required to maintain the wiring system. The technical information relative to the wiring system components currently resides in system or aircraft technical manuals, military and commercial specifications, as well as wiring component vendor catalogs. As this information is located in many different, and sometimes inaccessibly areas, this creates a significant increased impact on overall maintenance man-hours.

The predominant resource used by U.S. Navy Fleet maintainers, engineering and commercial manufacturers and repair activities are the system or aircraft Technical Manuals. These manuals are generally provided in paper format. Several problems of these resources include: the requirement of several hundred manuals to describe the operation, maintenance and repair processes; required information for a specific maintenance action is dispersed among multiple manuals; discontinuity of information; pages of paper technical manuals can be damaged and unreadable when used in inclement environments.

Thus, there is a need in the art to provide an information system without the limitations inherent in present methods.

SUMMARY

It is a feature of the invention to provide a just in time wiring information system that includes an aircraft wiring information system module, a technical reference module, an interactive computer aided cable repair system module, and an e-suite. The e-suite communicates with the aircraft wiring information system module, the technical reference module, and the interactive computer aided cable repair system module such that via the e-suite a user may obtain information from each of the modules.

It is a feature of the invention to provide a just in time wiring information system that decreases unscheduled maintenance man-hours on aircraft. It is another feature of the invention to provide a just in time wiring information system that reduces maintenance cycle times.

It is a feature of the invention to provide a just in time wiring information system that increases operational readiness and improved mission availability, decreases technical manual reproduction and distribution costs, and reduces engineering, logistics and maintenance planning costs.

It is a feature of the invention to provide a just in time wiring information system that operates as an umbrella program that can provide multiple resources in a central location.

BRIEF DESCRIPTION OF THE DRAWINGS

These and other features, aspects and advantages of the present invention will become better understood with reference to the following description and appended claims, and accompanying drawings wherein:

DETAILED DESCRIPTION

Figure 1:
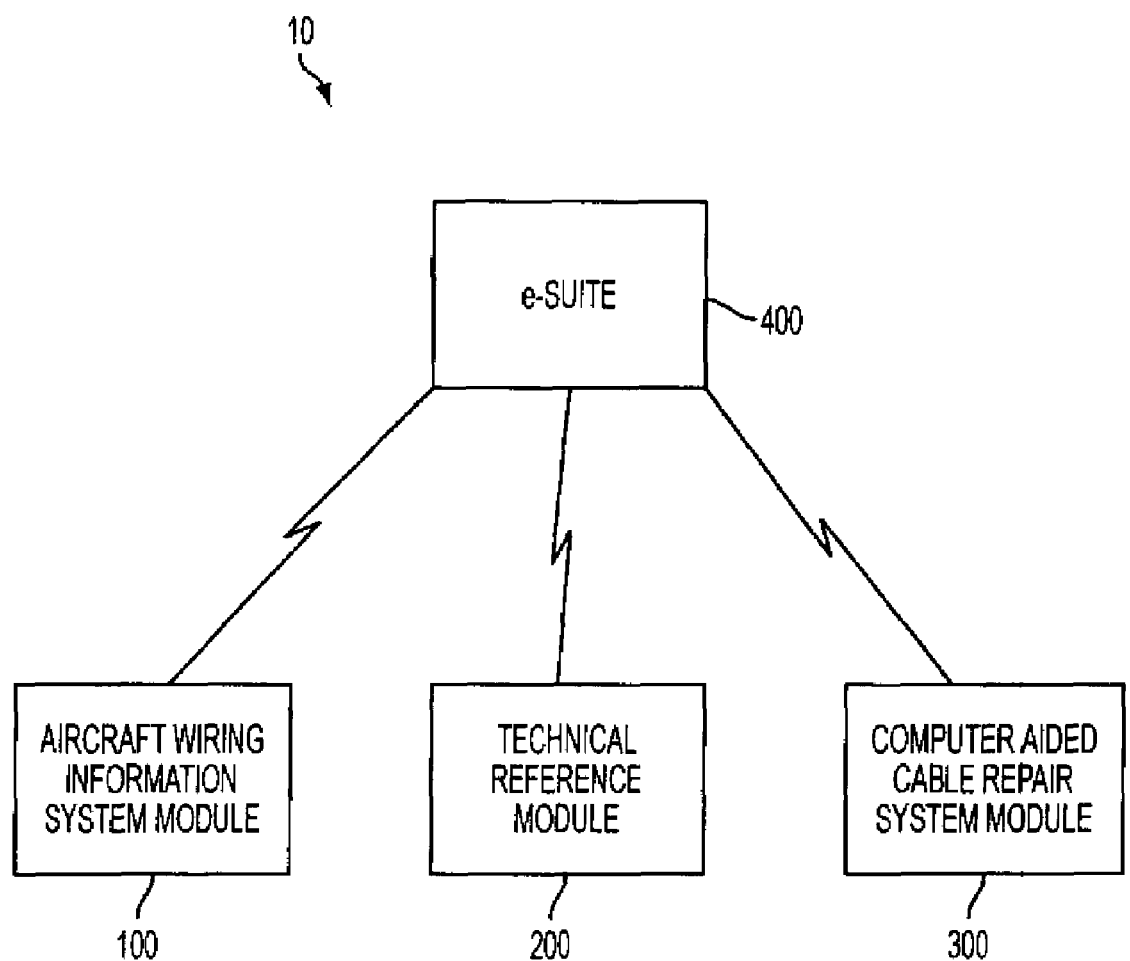
FIG. 1 shows a functional block diagram of an embodiment of the just in time wiring information system.

The preferred embodiment of the present invention is illustrated by way of example below and in FIGS. 1-8. As seen in FIG. 1, the just in time wiring information system (JITWIS)

10 includes an aircraft wiring information system module 100, a technical reference module 200, an interactive computer aided cable repair system module 300, and an e-suite 400. The e-suite 400 communicates with the aircraft wiring information system module 100, the technical reference module 200, and the interactive computer aided cable repair system module 300 such that via the e-suite 400 a user may obtain information from each of the modules.

In the discussion of the present invention, the system will be discussed in an aircraft wiring environment, specifically a tactical aircraft wiring environment, however, the system can also be utilized with other types of vehicles, apparatuses or machinery.

Figure 2:
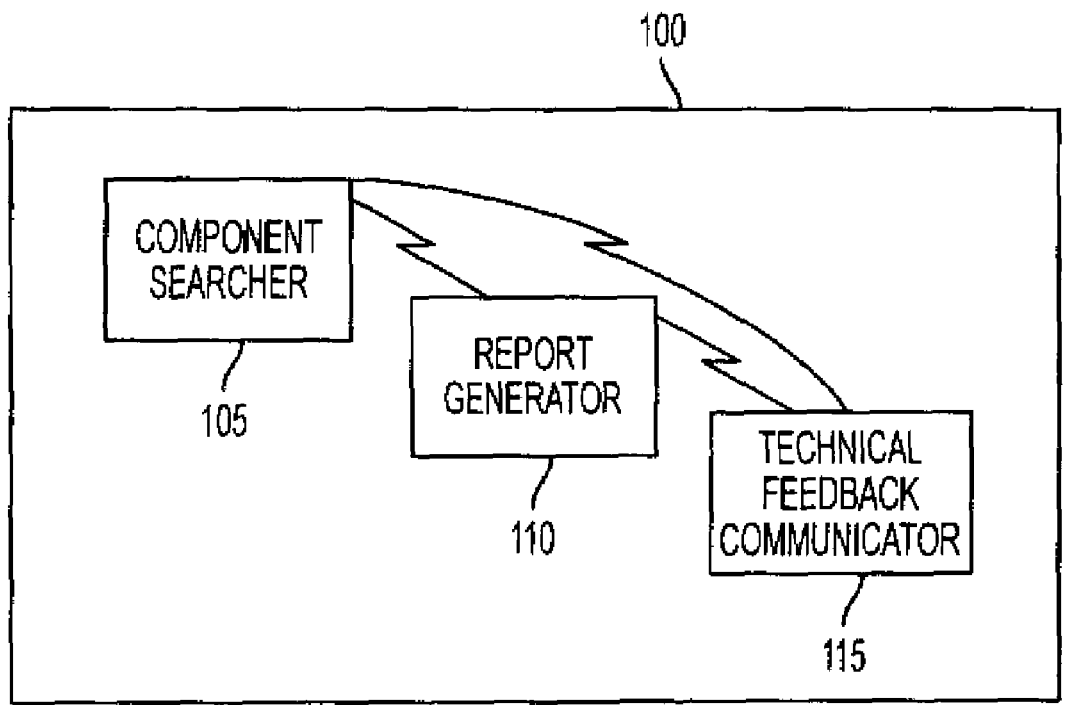
FIG. 2 shows a functional block diagram of an embodiment of the aircraft wiring information system module.

The aircraft wiring information system module 100 may be defined, but without limitation, as a database containing cross-referenced information on wiring system components and associated maintenance and repair tooling. The database may be electronic and web based. In the preferred embodiment, as seen in FIG. 2, the aircraft wiring information system module 100 may include, but without limitations, a component searcher 105, a report generator 110, and a technical feedback communicator 115. The component searcher 105 is a searcher that gives the user the ability to search the aircraft wiring information system module 100 for tooling for a specific tooling requirement based on the type of component and part number. The report generator 110 generates a report based on various criteria. For example, the user may request a report of connector components only for the F/A-18 EF platform. To obtain this report the user will choose the connector report and the F/A-18 EF platform. There are several types of reports that may be generated, for example, but without limitation, a connector report, a reference designator and harness report, and a tool set report. All these reports can be executed against a specific platform, i.e. F/A-18 EF, EA-6B, MH-60R, etc. The technical feedback communicator 115 allows two-way communication between a researcher and the user. The user may request information about a specific component/wiring that is not described or included in the system 100. In this case, the user may fill out a form and request that research be completed on a specific component or part number. When the form is completed, a notification is emailed to an administrator of the system with the request attached. This information is received and the applicable part number is researched by a researcher to identify the repair tools required to fix the component. The information can then be sent back to the user. The aircraft wiring information system module 100 may also include features that allow technical notes (i.e. unique information relating to a specific component) and tooling requirements (identifies specific tooling based on a component).

Figure 3:
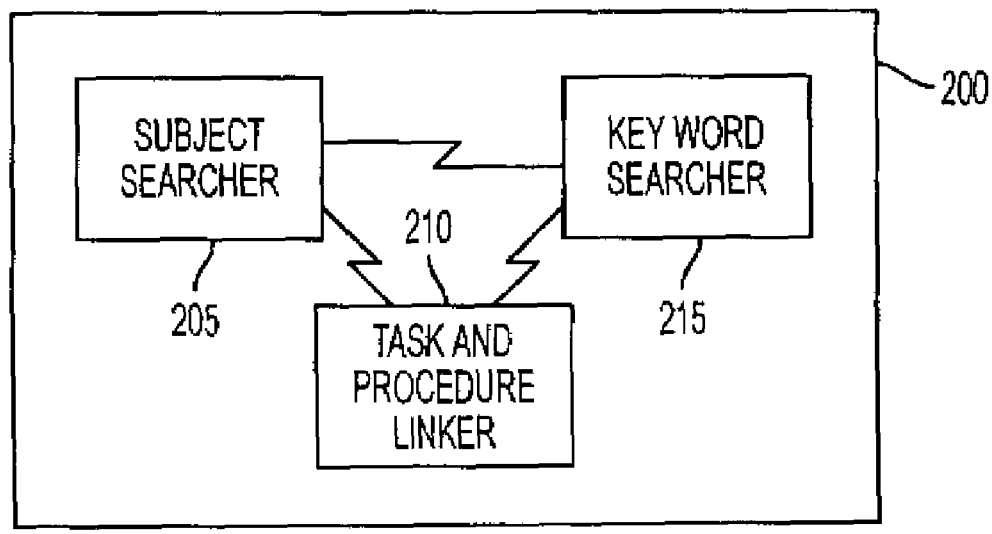
FIG. 3 shows a functional block diagram of an embodiment of the technical reference module.

The technical reference module 200 provides a centralized repository for wiring system maintenance information. The technical reference module 200 functions as a repository of documents that can be integrated into the just in time wiring information system 10 and provide specific technical information to users. In the preferred embodiment, as seen in FIG. 3, the technical reference module 200 includes a subject searcher 205, a task and procedure linker 210, and a key word searcher 215. The subject searcher 205 may permit searching of information disposed within the technical reference module 200 by linking an index with individual elements. The task and procedure linker 210 may permit searching task elements to required procedures disposed within the technical reference module 200. The key word searcher 215 may provide general search capability through the technical reference module 200. The technical reference module 200 may also include authorized repair procedures (provides authority for reparability) and quality assurance (identifies all authorized repair procedures with inspection criteria).

Figure 4:
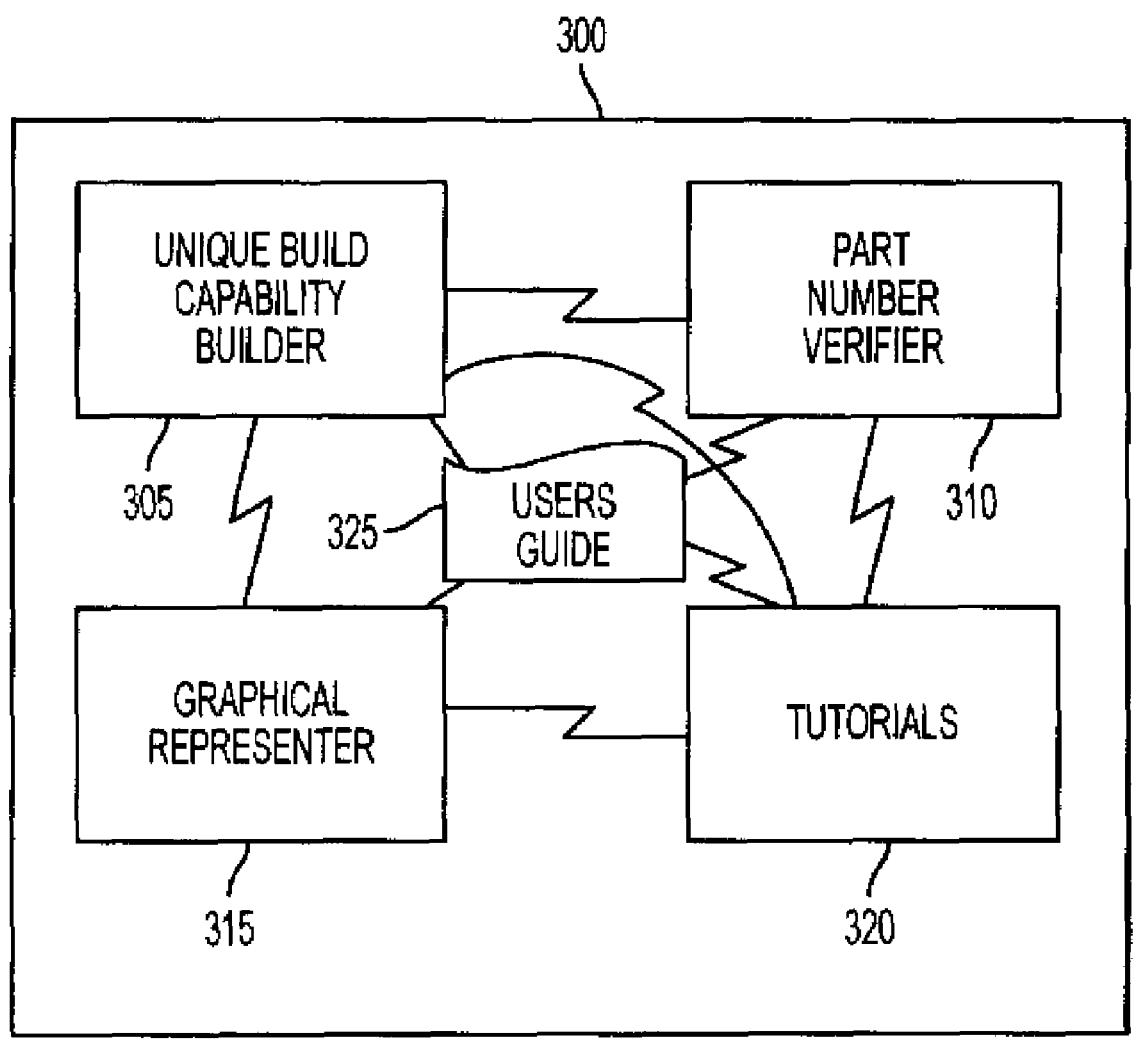
FIG. 4 shows a functional block diagram of an embodiment of the interactive computer aided cable repair system module.

The interactive computer aided cable repair system module 300 provides military specification (Mil-Spec) information and accessory identification for Mil-Spec families. As seen in FIG. 4, the interactive computer aided cable repair system module 300 may include the following features: a unique build capability builder 305; a part number verifier 310; a graphical representer 315; tutorials 320; and a users guide 325. The unique build capability builder 305 allows the user to "build" a part number for a component based solely on the physical characteristics of that component. The physical characteristics of the part number may be obtained from military specifications disposed within the interactive computer aided cable repair system module 300. The part number verifier 310 allows the user to verify the accuracy of a part number. The graphical representer 315 contains representative line drawings of connectors based on the military specification characteristics. In one of the embodiments, there are twenty-one military specifications contained in the interactive computer aided cable repair system module 300. These specifications contain information about the parts or components. For example, MIL-C-38999 contains specific information on the circular connectors in the 38999 families. The information includes, but is not limited to, the pin out of the connector, contacts which are applicable to the connector, etc. The tutorials 320 include various training modules for initial and refresher training. The users guide 325 is the operational description of the interactive computer aided cable repair system program.

Figure 5:
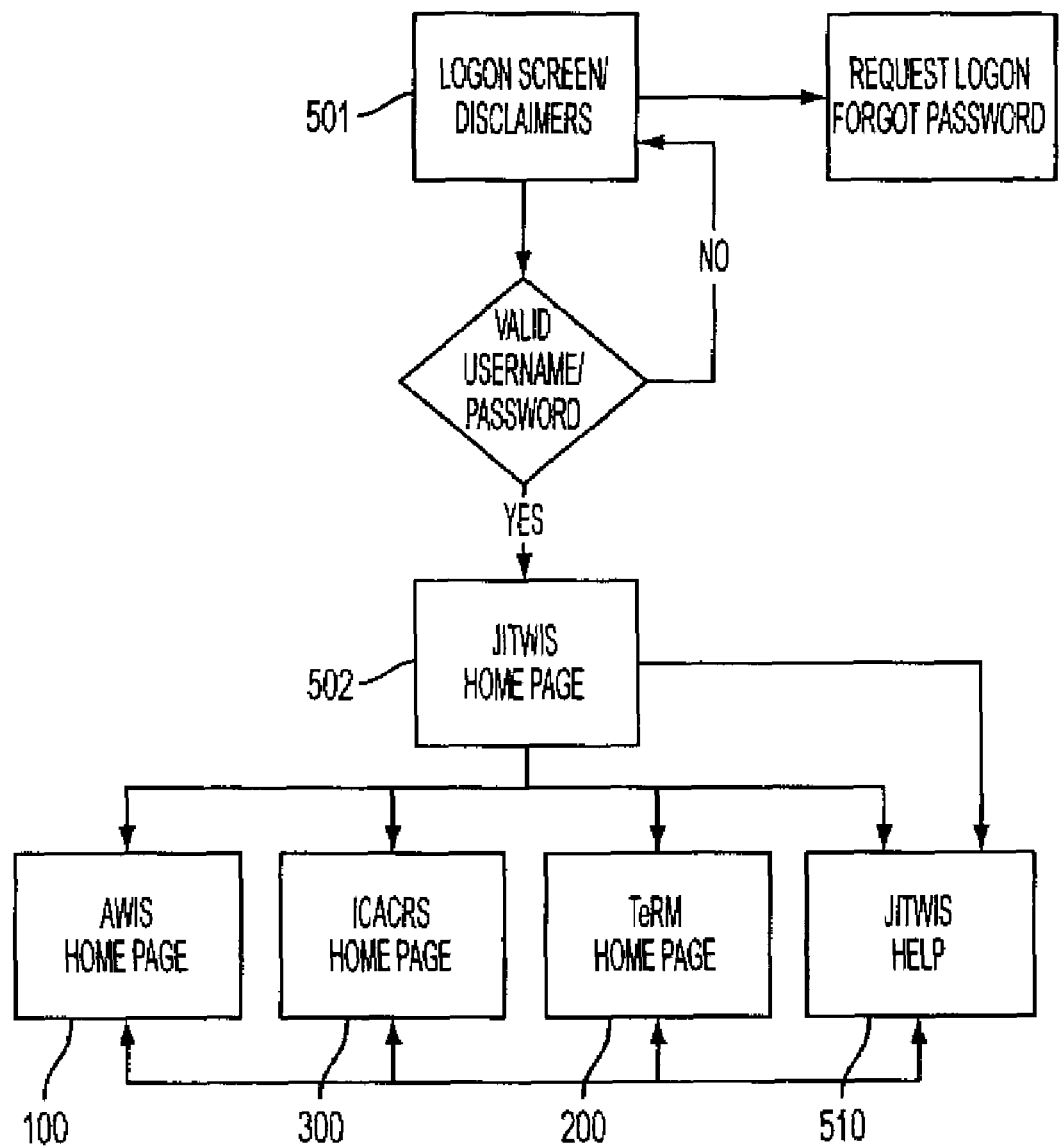
FIG. 5 shows a flow chart for entering an embodiment of the just in time wiring information system.

In operation, in one of the embodiments of the invention, when a user initiates the just in time wiring information system 10, as seen in FIG. 5, the system begins with an initial username and logon 501. Upon successful log-on, the system enters the just in time wiring information system 10 or JIT-WIS home page 502. This log-on as well as any operational commands or procedures, or communications between modules are executed by the e-suite 400. The user may then choose to enter the aircraft wiring information system module 100, the technical reference module 200, or the interactive computer aided cable repair system module 300 or a user help guide 510. Each module may be entered through a module home page as shown in FIG. 5.

Figure 6:
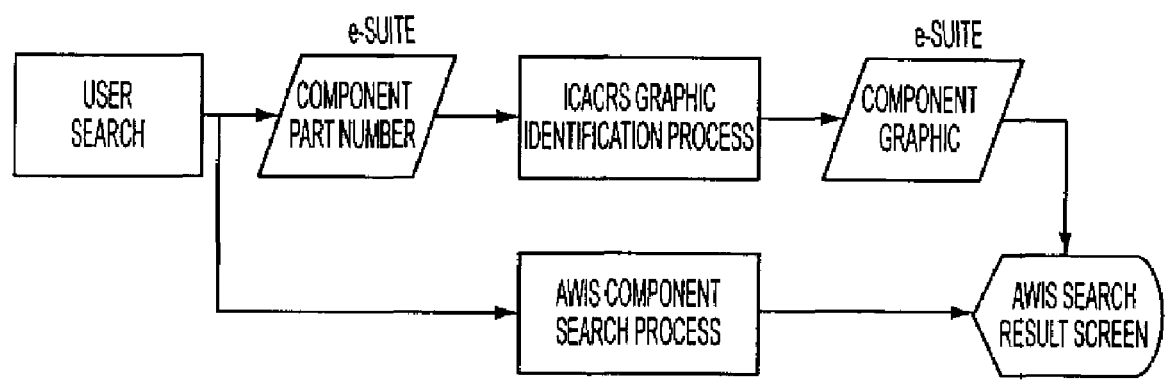
FIG. 6 shows a flow chart of an embodiment of the aircraft wiring information system module.

As shown in FIG. 6, in one of the embodiments of the invention, when the user enters the aircraft wiring information system module 100 and performs a search (via a user search), the part number is passed from the aircraft wiring information system module 100 to the interactive computer aided cable repair system module 300 via the e-suite 400. The interactive computer aided cable repair system module 300 then evaluates this part number (by performing a interactive computer aided cable repair graphic identification process), and a specific component graphic display is passed via the e-suite 400 to display in a frame within the aircraft wiring information system module 100 search results screen.

Figure 7:
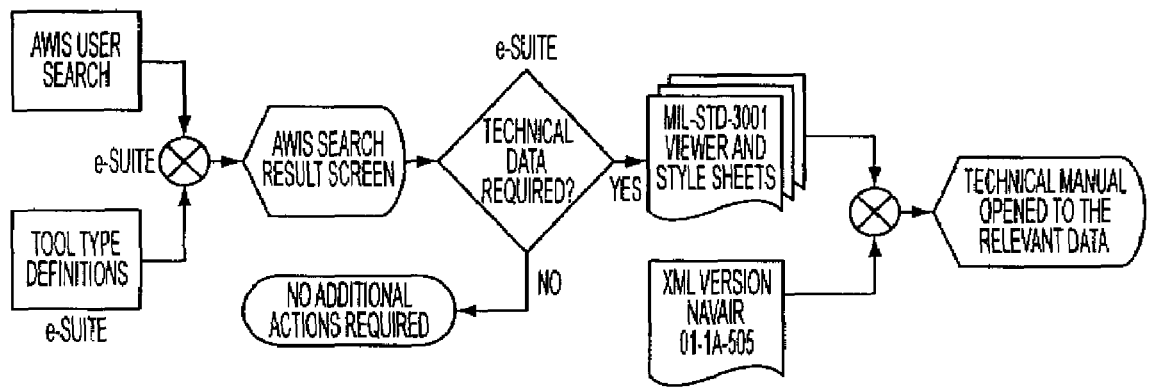
FIG. 7 shows a flow chart of the aircraft wiring information system module obtaining information; and, FIG. 8 shows a flow chart of the interactive computer aided cable repair system module obtaining information.

In an embodiment of the invention, within the aircraft wiring information system module 100 is the tooling information required to repair a component The tooling information contains the tool part number as well as a tool type that is assigned based on the function of the tool. The e-suite 400 provides a link to the military standard or technical data, which identifies how to properly use the tool. An example of this functionality is shown in FIG. 7.

Figure 8:
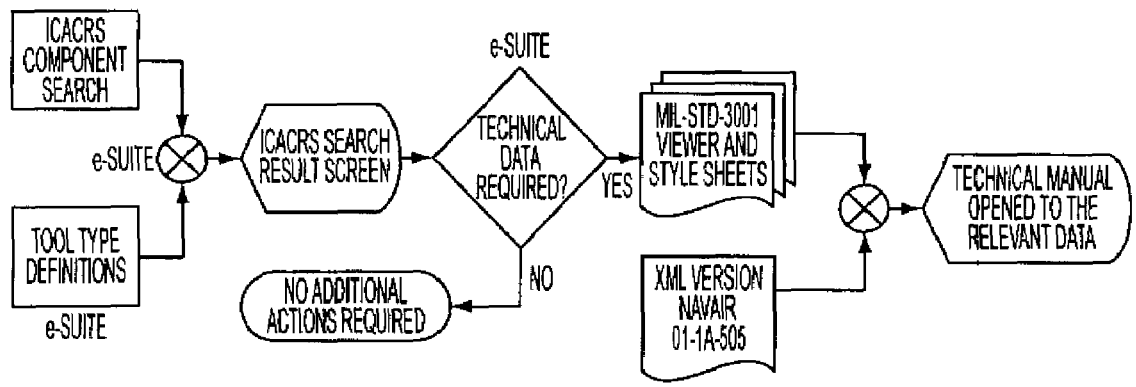

In an embodiment of the invention, within the interactive computer aided cable repair system module 300, once a part number is identified, the tooling information is also provided via the e-suite 400. The part number is evaluated and the tooling data request is evaluated by the aircraft wiring information system module 100, and then specific data is forwarded back to the interactive computer aided cable repair system module 300 for display. The tooling data includes the tool part number as well as the tool type. Once the tool type is provided, the e-suite 400 also provides a link to the military standard or technical data, which identifies how to properly use the tool. An example of this functionality is shown in FIG. 8.

The just in time wiring information system 10 may reside within a computer. This system (and its related algorithm) is executable on any computer with access to the input data required. The preferred embodiment of the algorithm is listed in the computer program-listing appendix.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment contained herein.

What is claimed is:

1. A just in time wiring information system comprising:
   a database containing cross-referenced information on wiring system components and associated maintenance and repair tooling;
   a centralized repository for wiring system maintenance information;
   a military specification (Mil-Spec) connector and accessory identificator for military specifications;
   an e-suite, the e-suite communicating with the database, the repository and the connector and identificator such that via the e-suite a user may obtain information from the database, the repository, and military specifications.

2. The just in time wiring information system of claim 1, wherein the database is electronic and web based.

3. The just in time wiring information system of claim 2, wherein the database comprising:
   a component searcher for searching tooling for a specific tooling requirement based on type of component and part number; and,
   a report generator for generating a report based on various criteria.

4. The just in time wiring information system of claim 3, wherein the centralized repository comprising:
   a subject searcher for searching documents disposed within the centralized repository;
   a task and procedure linker for searching task elements disposed within the centralized repository; and,
   a key word searcher for searching documents disposed within the centralized repository.

5. The just in time wiring information system of claim 4, wherein the military specification (Mil-Spec) connector and accessory identificator for military specifications comprising:
   a unique build capacity builder to obtain a part number for a component based solely on physical characteristics of the component, the physical characteristics of the part number obtained from military specifications;
   a part number verifier for verifying accuracy of a part number from military specifications; and,
   a graphical representer for displaying representative line drawings of connectors based on military specification characteristics.

* * * * *